(12) United States Patent
Zhang et al.

(10) Patent No.: US 10,823,651 B2
(45) Date of Patent: Nov. 3, 2020

(54) SUPERCRITICAL CARBON DIOXIDE FRACTURING CORE HOLDER UNDER THE INFLUENCE OF PORE PRESSURE SATURATION

(71) Applicant: China University of Petroleum-Beijing (CUPB), Beijing (CN)

(72) Inventors: Guangqing Zhang, Beijing (CN); Yuanyuan Wang, Beijing (CN); Yongwang Jiang, Beijing (CN); Cankun Lin, Beijing (CN)

(73) Assignee: China University of Petroleum—Beijing (CUPB), Beijing (CN)

( * ) Notice: Subject to any disclaimer, the term of this patent is extended or adjusted under 35 U.S.C. 154(b) by 251 days.

(21) Appl. No.: 15/965,869

(22) Filed: Apr. 28, 2018

(65) Prior Publication Data
US 2019/0025169 A1  Jan. 24, 2019

(30) Foreign Application Priority Data

Jul. 19, 2017 (CN) .......................... 2017 1 0589319

(51) Int. Cl.
*G01N 3/04* (2006.01)
*G01N 3/18* (2006.01)
(Continued)

(52) U.S. Cl.
CPC ............. *G01N 3/04* (2013.01); *E21B 49/081* (2013.01); *F17C 13/002* (2013.01); *G01N 3/12* (2013.01);
(Continued)

(58) Field of Classification Search
CPC .. G01N 3/04; G01N 3/12; G01N 3/18; G01N 15/0806; G01N 15/0826;
(Continued)

(56) References Cited

U.S. PATENT DOCUMENTS

| 4,791,822 A | * | 12/1988 | Penny | ................... E21B 43/267 73/38 |
| 2005/0152432 A1 | * | 7/2005 | Hakimuddin | ........ G01N 33/383 374/53 |

(Continued)

FOREIGN PATENT DOCUMENTS

| CN | 103233704 A | * | 8/2013 |
| CN | 103543092 A | * | 1/2014 |

(Continued)

OTHER PUBLICATIONS

Translation CN-103543092-A (Year: 2014).*

(Continued)

*Primary Examiner* — Peter J Macchiarolo
*Assistant Examiner* — Monica S Young
(74) *Attorney, Agent, or Firm* — Wayne & Ken, LLC; Tony Hom (57) ABSTRACT

The present invention provides a supercritical carbon dioxide core fracturing holder under pore pressure saturation, including a holding sleeve; a left end sleeve and a right end sleeve are correspondingly embedded at the two end ports of the holding sleeve, and a fixed plug is docked to the left end sleeve; a moving plug movably passes through the right end sleeve, and a piston ring is formed on the outer side face of the moving plug; a sealing rubber sleeve for holding a test sample is disposed; two axial fluid injection pipelines are correspondingly disposed within the fixed plug and the moving plug; and an axial displacement measuring device is disposed between the outer end of the right end sleeve and (Continued)

the moving plug, and a fluid injection chamber is formed between the inner wall of the holding sleeve and the outer side face of the sealing rubber sleeve.

4 Claims, 5 Drawing Sheets

(51) Int. Cl.
*G01N 3/12* (2006.01)
*G01N 15/08* (2006.01)
*F17C 13/00* (2006.01)
*E21B 49/08* (2006.01)
*E21B 43/24* (2006.01)

(52) U.S. Cl.
CPC ........... *G01N 3/18* (2013.01); *G01N 15/0806* (2013.01); *G01N 15/0826* (2013.01); *E21B 43/2405* (2013.01); *G01N 2203/0048* (2013.01); *G01N 2203/0062* (2013.01); *G01N 2203/0226* (2013.01); *G01N 2203/0232* (2013.01); *G01N 2203/0266* (2013.01); *G01N 2203/04* (2013.01); *G01N 2203/0635* (2013.01); *G01N 2203/0682* (2013.01)

(58) Field of Classification Search
CPC ... G01N 2203/0048; G01N 2203/0062; G01N 2203/0226; G01N 2203/0232; G01N 2203/0266; G01N 2203/04; G01N 2203/0635; G01N 2203/0682; E21B 49/081; E21B 43/2405; F17C 13/002
USPC .............................................................. 73/38
See application file for complete search history.

(56) References Cited

U.S. PATENT DOCUMENTS

2007/0079649 A1* 4/2007 Nauseda .............. B01D 63/082
73/40
2019/0339183 A1* 11/2019 Roberts .................... G01N 3/36

FOREIGN PATENT DOCUMENTS

CN 105510142 A * 4/2016
CN 105628811 A * 6/2016

OTHER PUBLICATIONS

Translation CN-103233704-A (Year: 2013).*
Translation CN-105628811-A (Year: 2016).*
Translation CN-105510142-A (Year: 2016).*

* cited by examiner

SUPERCRITICAL CARBON DIOXIDE FRACTURING CORE HOLDER UNDER THE INFLUENCE OF PORE PRESSURE SATURATION

TECHNICAL FIELD

The present invention belongs to the field of oil and gas reservoir exploitation and geotechnical engineering, specifically relates to a supercritical carbon dioxide core fracturing holder under pore pressure saturation.

BACKGROUND ART

In oil and gas exploitation, due to low porosity and low permeability of shale gas reservoirs, reservoir fracturing and permeability-increasing technologies must be applied to shale gas exploitation. In the United States, hydraulic fracturing technology is used to ensure the success in shale gas extraction; however, this technology needs large consumption of water resources and causes serious pollution to groundwater. And also, there is a high content of clay in shale in China, and shale is easy to expand upon exposure to water, causing adverse effects on reservoir stimulation. In addition, at present, shale gas reservoirs which have been discovered in China are generally located in basin-mountain areas facing the shortage of water resources, and shale gas exploitation in these areas is a big challenge.

Carbon dioxide may reach the supercritical state when the temperature and pressure of carbon dioxide exceed 31.10° C. and 7.38 MPa, respectively. Owing to similar diffusivity to gases and similar density and dissolution to liquids and the features of low viscosity and low surface tension as well as excellent flow, penetration and transfer performances, supercritical carbon dioxide can be used to replace clean water as fracturing fluid. However, there are few theoretical and experimental researches on shale fracturing operations using supercritical carbon dioxide, particularly the lack of corresponding experimental devices for simulating the changes in reservoir permeability, stress and strain in the process of shale fracturing operations using supercritical carbon dioxide, as a result, the use of carbon dioxide in shale gas exploitation is limited.

Hence, based on the production design experiences in this field and related fields, the inventor has developed a supercritical carbon dioxide core fracturing holder under pore pressure saturation, in order to solve the problems in the prior art.

SUMMARY OF THE INVENTION

An object of the present invention is to provide a supercritical carbon dioxide core fracturing holder under pore pressure saturation, which can implement related researches on supercritical carbon dioxide fracturing under the conditions of simulating high temperature, high stress and pore pressure involved of the formations, so as to provide conditions for the follow-up applications.

For this purpose, the present invention provides a supercritical carbon dioxide core fracturing holder under pore pressure saturation, comprising:

a holding sleeve with a left end sleeve and a right end sleeve being correspondingly embedded at the two end ports, a fixed plug being plug-connected at the left end sleeve;

a moving plug movably passing through the right end sleeve such that the two ends of the right end sleeve are closely fitted with the outer side face of the moving plug to form an annular chamber therebetween, the outer side face of the moving plug being formed with a piston ring that is in contact with the inner wall of the right end sleeve, so as to divide the annular chamber into a left chamber and a right chamber;

a sealing rubber sleeve, for holding a test sample, being disposed within the holding sleeve such that the two ends thereof are correspondingly socket-connected to the inner end of the fixed plug and inner end of the moving plug;

two axial fluid injection pipelines being correspondingly disposed within the fixed plug and the moving plug and in communication to the inner cavity of the sealing rubber sleeve; and an axial displacement measuring device, for measuring the movement distance of the moving plug relative to the right end sleeve, being disposed between the outer end of the right end sleeve and the moving plug;

wherein, a fluid injection chamber is formed between the part of the inner wall of the holding sleeve between the left end sleeve and the right end sleeve and the outer side face of the sealing rubber sleeve, with a fluid injection hole being disposed on the side wall thereof and in communication to the fluid injection chamber, and a filling hole is disposed on the side wall of the right end sleeve and in communication to the right chamber.

The supercritical carbon dioxide core fracturing holder under pore pressure saturation as described above, wherein, the axial displacement measuring device includes an LVDT sensor, a probe and a right side disc; the LVDT sensor is embedded on the outer end face of the right end sleeve; the right side disc is socket-connected on the outer end of the moving plug; and the probe is axially plug-connected and fixed on the right side disc, with one end thereof being inserted into the LVDT sensor.

The supercritical carbon dioxide core fracturing holder under pore pressure saturation as described above, wherein, at least one porous pad is also provided, and the porous pad is located at the end portion of the sealing rubber sleeve, with the inner end face thereof being adjacent to the end face of the test sample.

The supercritical carbon dioxide core fracturing holder under pore pressure saturation as described above, wherein, the porous pad is a round plate provided with a central hole, with a plurality of axial holes being disposed in the circumferential direction, wherein on the outer end face of the porous pad, each axial hole and the central hole are in communication through a channel, and two adjacent axial holes are in communication through a channel;

wherein at least one of the axial fluid injection pipelines is in communication to the central hole of the porous pad.

The supercritical carbon dioxide core fracturing holder under pore pressure saturation as described above, wherein, the inner end port of the right end sleeve is provided with a ring portion that is closely fitted with the outer side face of the moving plug, and the outer end port thereof is closely fitted with the moving plug by internally connecting a right end stopper.

The supercritical carbon dioxide core fracturing holder under pore pressure saturation as described above, wherein, the left end sleeve and the right end sleeve are respectively connected with the holding sleeve via external threads, and the fixed plug is connected with the left end sleeve via external threads.

The supercritical carbon dioxide core fracturing holder under pore pressure saturation as described above, wherein, the outer side faces of the left end sleeve and the right end sleeve are respectively formed with a ring groove, and a sealer is embedded within each ring groove.

The supercritical carbon dioxide core fracturing holder under pore pressure saturation as described above, wherein, a heating sleeve and a temperature sensor are disposed within the holding sleeve, the heating sleeve is located at the annular chamber, and the temperature sensor is disposed within the heating sleeve.

The supercritical carbon dioxide core fracturing holder under pore pressure saturation as described above, wherein, the fixed plug and the moving plug are a casing, respectively; the sealed ends of the two casings are opposed to each other and correspondingly connected with the two ends of the sealing rubber sleeve; the sealed ends of the two casings are respectively provided with an axial passage in communication to the inner cavity of the sealing rubber sleeve; one end of each axial passage is provided with a fluid injection pipeline adapter; the fluid injection pipeline adapters are located in the inner cavity of the casings; and the two axial fluid injection pipelines are correspondingly plug-connected on the two fluid injection pipeline adapters.

The supercritical carbon dioxide core fracturing holder under pore pressure saturation as described above, wherein, the fluid injection hole and the filling hole are respectively provided with a fluid injection pipeline adapter, and the fluid injection pipeline adapters are respectively provided with a radial fluid injection pipeline.

The supercritical carbon dioxide core fracturing holder under pore pressure saturation of the present invention can apply axial pressure and confining pressure to the test sample, simulate the high stress state of rock formations, fully simulate high temperature, high pressure, pore pressure involved and other environmental conditions of rock formations, thereby ensuring that supercritical carbon dioxide fracturing results conform better with the real situations. Further, the confining medium (hydraulic oil) injected is heated by the heating wires in the holder casings, and the temperature sensor monitors the temperature of the confining medium and the operation of the heating wires is controlled, so that the temperature of the sample keeps constant.

The supercritical carbon dioxide core fracturing holder under pore pressure saturation of the present invention has a simple structure and a small size, is convenient to operate, can implement supercritical carbon dioxide fracturing under the conditions of simulating high temperature, high stress and pore pressure involved of formations, and can also complete the detection of supercritical carbon dioxide permeability and mechanical parameters of cores.

BRIEF DESCRIPTION OF THE DRAWINGS

The following drawings are merely intended to schematically illustrate and explain the present invention rather than to limit the scope of the present invention. In the drawings.

DESCRIPTION OF REFERENCE NUMERALS OF MAIN ELEMENTS 1 holding sleeve 101 fluid injection chamber
102 fluid injection hole 11 left end sleeve
12 right end sleeve 120 filling hole
121 ring portion 122 right end stopper
122 right end stopper 13 ring groove
2 fixed plug
3 moving plug 30 annular chamber
301 left chamber 302 right chamber
31 piston ring 4 sealing rubber sleeve
5 axial fluid injection pipeline 6 axial displacement measuring device
61 LVDT sensor 62 probe
63 right side disc
7 porous pad 71 central hole
72 axial hole 73 channel
81, 82 fluid injection pipeline adapter 83 radial fluid injection pipeline
9 test sample

DETAILED DESCRIPTION OF THE INVENTION

For the above purposes, the present invention provides a supercritical carbon dioxide core fracturing holder under pore pressure saturation, comprising a holding sleeve with a left end sleeve and a right end sleeve being correspondingly embedded at the two end ports, a fixed plug being plug-connected at the left end sleeve; a moving plug movably passing through the right end sleeve such that the two ends of the right end sleeve are closely fitted with the outer side face of the moving plug to form an annular chamber therebetween, the outer side face of the moving plug being formed with a piston ring that is in contact with the inner wall of the right end sleeve, so as to divide the annular chamber into a left chamber and a right chamber; a sealing rubber sleeve, for holding a test sample, being disposed within the holding sleeve such that the two ends thereof are correspondingly socket-connected to the inner end of the fixed plug and inner end of the moving plug; two axial fluid injection pipelines being correspondingly disposed within the fixed plug and the moving plug and in communication to the inner cavity of the sealing rubber sleeve; and an axial displacement measuring device, for measuring the movement distance of the moving plug relative to the right end sleeve, being disposed between the outer end of the right end sleeve and the moving plug; wherein, a fluid injection chamber is formed between the part of the inner wall of the holding sleeve between the left end sleeve and the right end sleeve and the outer side face of the sealing rubber sleeve, with a fluid injection hole being disposed on the side wall thereof and in communication to the fluid injection chamber, and a filling hole is disposed on the side wall of the right end sleeve and in communication to the right chamber.

The supercritical carbon dioxide core fracturing holder under pore pressure saturation of the present invention can implement related researches on supercritical carbon dioxide fracturing under the conditions of simulating high temperature, high stress and pore pressure involved of formations, so as to provide conditions for subsequent application.

In order to more clearly understand the technical characteristics, objects and effects of the present invention, the particular embodiments, structures, features and functions of the supercritical carbon dioxide core fracturing holder under pore pressure saturation provided by the present invention will be described below with reference to the accompanying drawings and preferred embodiments. In addition, with the description of the particular embodiments, the technical means and effects taken for reaching the intended purposes of the present can be understood more deeply and clearly, however, the accompanying drawings are merely intended to provide reference and explanation rather than to limit the invention. In the drawings, the similar reference numerals represent the similar components.

Figure 1:
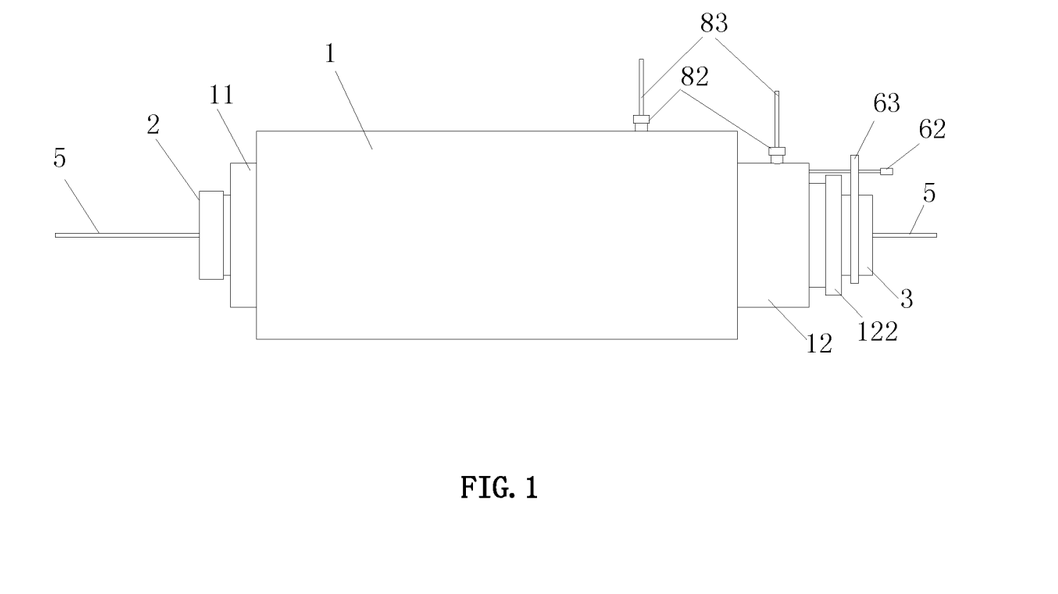
FIG. 1 schematically shows the profile of a supercritical carbon dioxide core fracturing holder under pore pressure saturation in accordance with the present invention.
Figure 2:
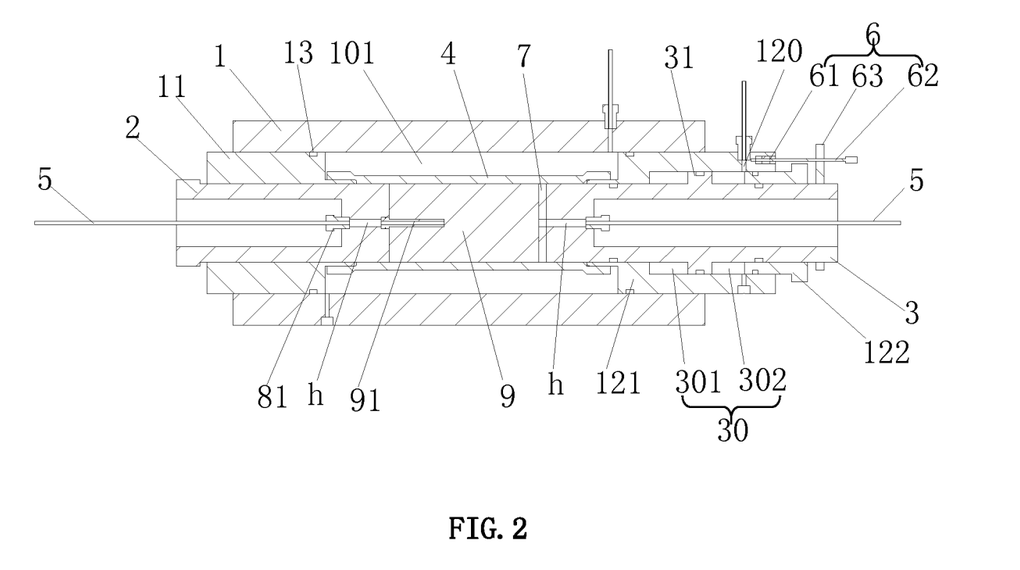
FIG. 2 is a sectional view of a supercritical carbon dioxide core fracturing holder under pore pressure saturation in accordance with the present invention.
Figure 3:
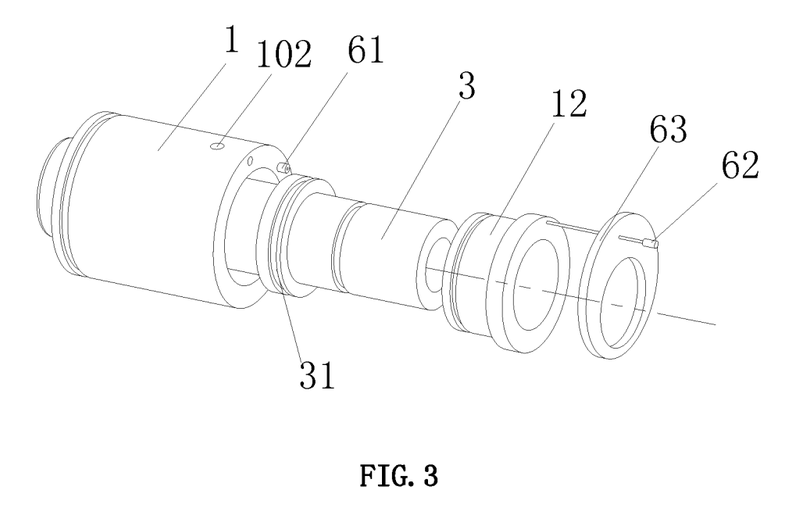
FIG. 3 is a stereoscopic schematic view of components of the right side portion of a supercritical carbon dioxide core fracturing holder under pore pressure saturation in accordance with the present invention.
Figure 4:
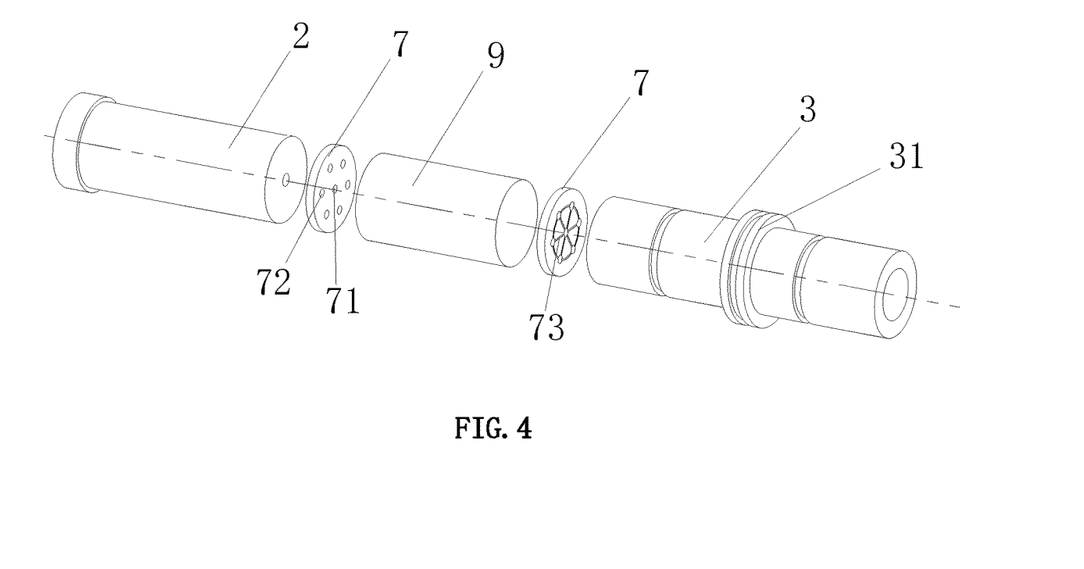
FIG. 4 schematically shows the mutual position relationship among a fixed plug, a test sample and a moving plug in a supercritical carbon dioxide core fracturing holder under pore pressure saturation in accordance with the present invention.
Figure 5:
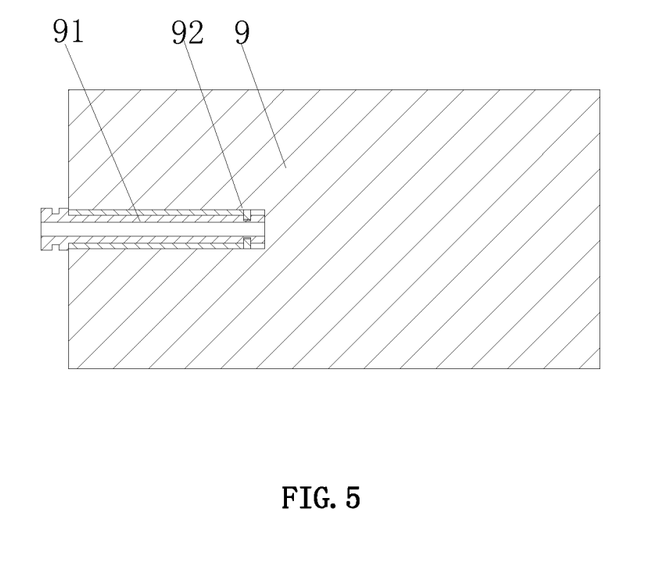
FIG. 5 is a sectional view of a test sample and a simulated wellbore used herein.

FIG. 1 schematically shows the profile of a supercritical carbon dioxide core fracturing holder under pore pressure saturation in accordance with the present invention. FIG. 2 is a sectional view of a supercritical carbon dioxide core fracturing holder under pore pressure saturation in accordance with the present invention. FIG. 3 is a stereoscopic schematic view of components of the right side portion of a supercritical carbon dioxide core fracturing holder under pore pressure saturation in accordance with the present invention. FIG. 4 schematically shows the mutual position relationship among a fixed plug, a test sample and a moving plug in a supercritical carbon dioxide core fracturing holder under pore pressure saturation in accordance with the present invention. FIG. 5 is a sectional view of a test sample and a simulated wellbore used herein.

As shown in FIG. 1 and FIG. 2, a supercritical carbon dioxide core fracturing holder under pore pressure saturation provided by the present invention comprises:

a holding sleeve 1 with a left end sleeve 11 and a right end sleeve 12 being correspondingly embedded at the two end ports, a fixed plug 2 being plug-connected at the left end sleeve 11;

a moving plug 3 movably passing through the right end sleeve 12 such that the two ends of the right end sleeve 12 are closely fitted with the outer side face of the moving plug 3 to form an annular chamber 30 therebetween, the outer side face of the moving plug 3 being formed with a piston ring 31 that is in contact with the inner wall of the right end sleeve 12, so as to divide the annular chamber into a left chamber 301 and a right chamber 302;

a sealing rubber sleeve 4, for holding a test sample, being disposed within the holding sleeve 1 such that the two ends thereof are correspondingly socket-connected to the inner end of the fixed plug 2 and inner end of the moving plug 3;

two axial fluid injection pipelines 5 being correspondingly disposed within the fixed plug 2 and the moving plug 3 and in communication to the inner cavity of the sealing rubber sleeve 4; and an axial displacement measuring device 6, for measuring the movement distance of the moving plug 3 relative to the right end sleeve 12, being disposed between the outer end of the right end sleeve 12 and the moving plug 3;

wherein, a fluid injection chamber 101 is formed between the part of the inner wall of the holding sleeve 1 between the left end sleeve 11 and the right end sleeve 12 and the outer side face of the sealing rubber sleeve 4, with a fluid injection hole 102 being disposed on the side wall thereof and in communication to the fluid injection chamber 101, and a filling hole 120 is disposed on the side wall of the right end sleeve 12 and in communication to the right chamber 302.

Referring also to FIG. 3, the axial displacement measuring device 6 includes an LVDT sensor 61, a probe 62 and a right side disc 63; the LVDT sensor 61 is embedded on the outer end face of the right end sleeve 12; the right side disc 63 is socket-connected on the outer end of the moving plug 3; and the probe 62 is axially plug-connected and fixed on the right side disc 63, with one end thereof being inserted into the LVDT sensor 61. Wherein, the LVDT sensor 61 (Linear Variable Differential Transformer), an abbreviation for linear variable differential transformer, belongs to a linear displacement sensor, and when in use, the probe is inserted into a measurement hole of the LVDT sensor. The structure and working principle of the LVDT sensor 61 are well known in the art and not described herein.

In practical use, when the moving plug 3 moves relative to the right end sleeve 12, the right side disc 63 moves together with the probe 62, and the LVDT sensor 61 detects the displacement distance of the probe 62 moving therein to obtain the movement distance of the moving plug 3, thereby detecting the deformation of the test sample.

Wherein, at least one porous pad 7 is also provided, and the porous pad 7 is located at the end portion of the sealing rubber sleeve 4, with the inner end face thereof being adjacent to the end face of the test sample, so that the test sample can be better positioned within the sealing rubber sleeve 4 to avoid shifting.

Preferably, the porous pad 7 is a round plate provided with a central hole 71, with a plurality of axial holes 72 being disposed in the circumferential direction, wherein on the outer end face of the porous pad 7, each axial hole 72 and the central hole 71 are communicated through a channel 73, and two adjacent axial holes 72 are communicated through a channel 73, so that a fluid flowing into the center hole 71 is diverted to the axial holes, thereby ensuring full contact of the fluid with the test sample;

wherein, at least one of the axial fluid injection pipelines 5 is in communication to the central hole 71 of the porous pad 7. It is noted that the quantity of the porous pad 7 may depend on actual needs. For example, one porous pad 7 is schematically shown in FIG. 2, located between the inner end of the test sample and the inner end of the movable plug 3, and in communication to the axial fluid injection pipeline 5 located at the movable plug 3; As shown in FIG. 4, two porous pads 7 are schematically shown, respectively located between the inner end of the fixed plug 2 and the left end of the test sample and between the right end of the test sample and the inner end of the movable plug 3, and correspondingly in communication to the two axial fluid injection pipelines 5.

Preferably, the inner end port of the right end sleeve 12 is provided with a ring portion 121 that is closely fitted with the outer side face of the moving plug 3, and the outer end port thereof is closely fitted with the moving plug 3 by internally connecting a right end stopper 122, so that the annular chamber 30 is formed between the ring portion 121 and the right end plug 122.

In order to enable close connection among the components, the left end sleeve 11 and the right end sleeve 12 are preferably connected with the holding sleeve 3 via external threads, respectively; and the fixed plug 2 is connected with the left end sleeve 11 via external threads.

Further, the outer side faces of the left end sleeve 11 and the right end sleeve 12 are respectively formed with a ring groove 13, and a sealer (not shown) is embedded within each ring groove to improve the sealing performance at the junctions of the components. Wherein, in practical use, the sealing rubber sleeve 4 and the sealer are preferably made of a material with strong acid resistance and high temperature resistance, such as polytetrafluoroethylene.

In a preferred embodiment, a heating sleeve (not shown) and a temperature sensor (not shown) are disposed in the holding sleeve 3, the heating sleeve is located at the fluid injection chamber 101, and the temperature sensor is placed within the heating sleeve, which is helpful for heat insulation of the holding sleeve 3. In practical use, after a hydraulic oil is injected into the fluid injection chamber 101 through the fluid injection hole 102, the temperature sensor can monitor the temperature of the hydraulic oil in real time, and the hydraulic oil is heated through the heating wires to control the hydraulic oil at an appropriate temperature and maintain constant. During installation, the heating sleeve may be installed within the holding sleeve 5 and the temperature sensor may be placed within the heating sleeve, or the temperature sensor may be placed adjacent to the heating sleeve, so that the heating process is more uniform and the temperature control is more accurate. Also, the wires may be allowed to extend through the side wall of the holding sleeve 5 to connect with the temperature sensor and the heating sleeve respectively and to be connected onto the corresponding monitoring device, with convenience in use.

As shown in FIG. 2, preferably, the fixed plug 2 and the moving plug 3 are respectively a casing, the sealed ends of the two casings are opposed to each other and correspondingly connected with the two ends of the sealing rubber sleeve; the sealed ends of the two casings are respectively provided with an axial passage h in communication to the inner cavity of the sealing rubber sleeve 4; one end of each axial passage h is provided with a fluid injection pipeline adapter 81; the fluid injection pipeline adapters 81 are located in the inner cavity of the casings; and the two axial fluid injection pipelines 5 are correspondingly plug-connected on the two fluid injection pipeline adapters 81.

Preferably, two fluid injection pipeline adapter 82 are disposed at the fluid injection hole 102 and the filling hole 120, respectively; and a radial fluid injection pipeline 83 is disposed at each fluid injection pipeline adapter 82.

Referring also to FIG. 1 to FIG. 5, the supercritical carbon dioxide core fracturing holder under pore pressure saturation provided by the present invention are described herein by an example of a fracturing test using supercritical carbon dioxide (temperature of 31.10° C. or above and pressure of 7.38 MPa or above) under pore pressure saturation. The operation process of the present invention is specifically described as follows:

step 1, a test sample (core) 9 was prepared, a groove was drilled at the left end of the test sample 9, and a simulated wellbore 91 was fixed within the groove of the test sample 9 (see FIG. 5), wherein, the simulated wellbore 91 may be fixed within the groove of the test sample 9 through AB adhesive, the outer side face of the inner end of the simulated wellbore was sealed with a sealer 92 relative to the groove wall of the test sample, so as to prevent the test sample AB adhesive flowing into the groove bottom to cause the difficulty in fracturing of the test sample during fracturing, then the test sample 9 was put into a sealing rubber sleeve 4, such that the outer end of the simulated wellbore is connected with a fixed plug 2, and in communication to axial fluid injection pipelines 5, then, the sealing rubber sleeve 4 was fixed within a holding sleeve 1 by the connection method mentioned above, wherein, the porous pad 7 was placed between the right end of the test sample and the moving plug 4, the porous pad 7 was fitted with the right end of the test sample 9 and the moving plug 4;

step 2, the injection chamber 101 was filled with a hydraulic oil through a fluid injection hole 102 using a plunger pump, and the temperature of the hydraulic oil was controlled by heating wires and a temperature sensor to maintain the oil temperature at a preset value (for example, 35° C.), so that the confining pressure exerted by the hydraulic oil on the test sample was a preset value of confining pressure;

step 3, a fluid was injected into the right chamber 302 through the filling hole 120, and under the pushing action of the hydraulic pressure on the piston ring 31, the moving plug 3 was moved to the left, an axial pressure was applied to the test sample 9, and when the axial pressure reached a preset value, the fluid injection was stopped;

step 4, nitrogen gas was slowly introduced into the axial fluid injection pipeline 5 within the moving plug 3, and entered the right end of the test sample 9 through the corresponding fluid injection pipeline adapter 81 and the axial channel, and when the nitrogen gas pressure (the pore pressure of the test sample) reached a preset value and maintained constant, the pore pressure at the test sample 9 reached the preset pressure;

step 5, a supercritical carbon dioxide fluid was slowly injected into the axial fluid injection pipeline 5 within the fixed plug 2 and entered the outer end of the simulated wellbore 91 through the corresponding fluid injection pipeline adapter 81 and the axial channel, and entered the test sample through the inner end of the simulated wellbore 91, so as to perform supercritical carbon dioxide fracturing test under pore pressure saturation on the test sample;

step 6, after the experiment was completed, the gas was firstly exhausted through the axial fluid injection pipeline 5 on the fixed plug 3 to release the pore pressure inside the test sample 9, and the fluid was discharged through the fluid injection hole 102 of the holding sleeve 1 and the filling hole 120 on the right end sleeve 2, thereby removing the confining pressure and axial pressure on the test sample 11, finally, the fixed plug 2 was unscrewed and the test sample 9 was taken out for the observation of fractures formed on the test sample 9.

In addition, according to the present invention, an experiment of supercritical carbon dioxide permeability may also be conducted, and the operation process is described as follows:

step 1, a test sample (core) 9 was prepared, the test sample 9 was put into the sealing rubber sleeve 4, the porous pads 7 were respectively disposed at the two ends of the the test sample 9, and the sealing rubber sleeve 4 was fixed within the holding sleeve 1 by the connection method mentioned above;

step 2, the injection chamber 101 was filled with a hydraulic oil through a fluid injection hole 102 using a plunger pump, and the temperature of the hydraulic oil was controlled by heating wires and a temperature sensor to maintain the oil temperature at a preset value (for example, 35° C.), so that the confining pressure exerted by the hydraulic oil on the test sample was a preset value of confining pressure;

step 3, a fluid was injected into the right chamber 302 through the filling hole 120, and under the pushing action of the hydraulic pressure on the piston ring 31, the moving plug 3 was moved to the left, an axial pressure was applied to the test sample 9, and when the axial pressure reached a preset value, the fluid injection was stopped;

step 4, a supercritical carbon dioxide fluid was respectively injected into the axial fluid injection pipelines 5 of the fixed plug 2 and the moving plug 3 under a first pressure (e.g. P1=7.38 MPa); after the supercritical carbon dioxide in the test sample 1 reached a saturated state, the injection pressure of the left plug to a second pressure (for example, P2=10 MPa), the flow rate Q of the supercritical carbon dioxide flowing into the test sample 9 was recorded using a flow meter disposed on the pipelines, to calculate the supercritical carbon dioxide permeability for rock materials, specifically, the data was processed based on the known permeability calculation expression as follows:

k=2000*P2*QuL/A(P22−P21), in which k represents permeability, 10-3 μm2; P1 and P2 represent pressure at the two ends of the test sample, MPa; L represents the length of the test sample, mm; A represents the cross sectional area of the test sample, mm2; u represents the viscosity of supercritical carbon dioxide, mpa·s; Q represents the flow rate, cm3/s;

step 5, after the experiment was completed, the gas was firstly exhausted through the axial fluid injection pipeline 5 on the fixed plug 2 to release the pore pressure inside the test sample 9, and the fluid was discharged through the fluid injection hole 102 of the holding sleeve 1 and the filling hole 120 on the right end sleeve 2, thereby removing the confining pressure and axial pressure on the test sample 11, finally, the fixed plug 2 was unscrewed and the test sample 9 was taken out, ending the experiment.

Further, the present invention is also applied to the test of rock mechanics parameters using supercritical carbon dioxide in a saturated state, and the operation process is described as follows:

step 1, a test sample (core) 9 was prepared, the test sample 9 was put into the sealing rubber sleeve 4, the porous pads 7 were respectively disposed at the two ends of the the test sample 9, and the sealing rubber sleeve 4 was fixed within the holding sleeve 1 by the connection method mentioned above;

step 2, the injection chamber 101 was filled with a hydraulic oil through a fluid injection hole 102 using a plunger pump, and the temperature of the hydraulic oil was controlled by heating wires and a temperature sensor to maintain the oil temperature at a preset value (for example, 35° C.), so that the confining pressure exerted by the hydraulic oil on the test sample was a preset value of confining pressure;

step 3, a fluid was injected into the right chamber 302 through the filling hole 120, and under the pushing action of the hydraulic pressure on the piston ring 31, the moving plug 3 was moved to the left, a pretightening force (e.g. 0.2KN) was applied to the test sample 9;

step 4, a supercritical carbon dioxide fluid was slowly introduced into the axial fluid injection pipeline 5 within the moving plug 3, and entered the right end of the test sample 9 through the corresponding fluid injection pipeline adapter 81 and the axial channel h, and when the carbon dioxide pressure (the pore pressure of the test sample) reached a preset value and maintained constant, the pore pressure at the test sample 9 reached the preset pressure;

step 5, a fluid was injected into the right chamber 302 through the filling hole 120, under the pushing action of the hydraulic pressure on the piston ring 31, the moving plug 3 was moved to the left, an axial pressure was applied to the test sample 9, to enable deformation of the test sample 1 under the axial pressure, when the right plug 4 was moved relative to the right end sleeve 12, the right side disc 63 was moved together with the probe 62, while the LVDT sensor 61 detected the displacement distance of the probe 62 moving therein, to obtain the movement distance of the right plug 4, thereby obtaining the compression of the test sample 1, the LVDT sensor recorded the deformation of the test sample, wherein, during the test, the axial pressure value and deformation value of the test sample were recorded, in a practical experiment, a fluid may be injected at a certain flow rate into the fluid injection chamber 120, so that the test sample was loaded by moving plug 3 at a loading rate of 0.01 mm/min, facilitating the subsequent calculation;

and then, based on the recorded data of loaded axial pressure and axial compression of the test sample, the elastic modulus and triaxial compressive strength of the test sample 1 under supercritical carbon dioxide saturation condition were calculated using the corresponding expressions.

Specifically, the data was processed based on the calculation expressions for elastic modulus and compressive strength as follows:

σu=Pmax/A, wherein, σu represents the triaxial compressive strength, MPa; Pmax represents the maximum axial load, N; A represents the initial cross sectional area of the test sample, mm2;

E=Δσ50%/Δξ1, wherein, E represents the elastic modulus, MPa; Δσ50% represents the difference in axial stress; Δξ1 represents the difference in axial strain, in a no-dimensional mode.

Wherein, in the fracturing test and permeability experiment, the test sample 9 is preferably a cylindrical rock (core) having a diameter of 38 mm and a height of 76 mm, the groove at the left end of the test sample 9 has a diameter of 15 mm and a depth of 38 mm; The confining pressure applied to the test sample should be greater than 7.38 MPa, the pressure of supercritical carbon dioxide applied to both ends of the test sample is less than the confining pressure, and the axial pressure applied by the moving plug 4 to the test sample is greater than 7.38 MPa, wherein, preferably, the confining pressure of the sample is set at 9 MPa, the axial pressure of the sample is 8 MPa, and the pore pressure of the sample (nitrogen pressure for fracturing test/pressure of carbon dioxide for permeability experiment) is 7.5 MPa.

In addition, during operation, a pressure sensor may be provided at the annular chamber 101 and the fluid injection hole 102 to monitor the confining pressure, and a pressure sensor may be provided within the fixed plug 2 and the moving plug 3 to monitor the supercritical carbon dioxide pressure, facilitating the subsequent procedures.

In summary, the supercritical carbon dioxide core fracturing holder under pore pressure saturation of the present invention can apply axial pressure and confining pressure to the test sample, simulate the high stress state of rock formations, fully simulate high temperature, high pressure, pore pressure involved and other environmental conditions of rock formations, thereby ensuring that supercritical carbon dioxide fracturing results conform better with the real situations. Further, the confining medium (hydraulic oil) injected is heated by the heating wires in the holder casings, and the temperature sensor monitors the temperature of the confining medium and the operation of the heating wires is controlled, so that the temperature of the sample keeps constant.

The supercritical carbon dioxide core fracturing holder under pore pressure saturation of the present invention has a simple structure and a small size, is convenient to operate, can implement supercritical carbon dioxide fracturing under the conditions of simulating high temperature, high stress and pore pressure involved of formations, and can also complete the detection of supercritical carbon dioxide permeability and mechanical parameters of cores.

The foregoing description is merely illustrative of the present invention and not intended to limit the scope of the present invention. Any equivalent changes and modifications made by any skilled in the art without departing from the concept and principle of the present invention shall fall within the protection scope of the present invention.

What is claimed is:

1. A supercritical carbon dioxide core fracturing holder under pore pressure saturation, characterized in that, the supercritical carbon dioxide core fracturing holder comprises: a holding sleeve with a left end sleeve and a right end sleeve being correspondingly embedded at the two end ports, a fixed plug being plug-connected at the left end sleeve;
   a moving plug movably passing through the right end sleeve such that the two ends of the right end sleeve are closely fitted with the outer side face of the moving plug to form an annular chamber therebetween, the outer side face of the moving plug being formed with a piston ring that is in contact with the inner wall of the right end sleeve, so as to divide the annular chamber into a left chamber and a right chamber;
   a sealing rubber sleeve, for holding a test sample, being disposed within the holding sleeve such that the two ends thereof are correspondingly socket-connected to the inner end of the fixed plug and inner end of the moving plug;
   two axial fluid injection pipelines being correspondingly disposed within the fixed plug and the moving plug and in communication to the inner cavity of the sealing rubber sleeve; and
   an axial displacement measuring device, for measuring the movement distance of the moving plug relative to the right end sleeve, being disposed between the outer end of the right end sleeve and the moving plug;
   wherein, a fluid injection chamber is formed between the part of the inner wall of the holding sleeve between the left end sleeve and the right end sleeve and the outer side face of the sealing rubber sleeve, with a fluid injection hole being disposed on the side wall thereof and in communication to the fluid injection chamber, and a filling hole is disposed on the side wall of the right end sleeve and in communication to the right chamber;
   wherein at least one porous pad is further provided at an end portion of the sealing rubber sleeve; an inner end face of each of the at least one porous pad is adjacent to an end face of the test sample;
   each of the at least one porous pad is a round plate provided with a central hole and a plurality of axial holes being disposed in a circumferential direction, wherein on an outer end face of the porous pad, each of the axial holes and the central hole are in communication through a channel, and two adjacent axial holes are in communication through a channel; and at least one of the axial fluid injection pipelines is in communication to the central hole of each of the at least one porous pad.

2. The supercritical carbon dioxide core fracturing holder under pore pressure saturation according to claim 1, characterized in that, the axial displacement measuring device includes an LVDT sensor, a probe and a right side disc; the LVDT sensor is embedded on the outer end face of the right end sleeve; the right side disc is socket-connected on the outer end of the moving plug; and the probe is axially plug-connected and fixed on the right side disc, with one end thereof being inserted into the LVDT sensor.

3. The supercritical carbon dioxide core fracturing holder under pore pressure saturation according to claim 1, characterized in that, the inner end port of the right end sleeve is provided with a ring portion that is closely fitted with the outer side face of the moving plug, and the outer end port thereof is closely fitted with the moving plug by internally connecting a right end stopper.

4. The supercritical carbon dioxide core fracturing holder under pore pressure saturation according to claim 1, characterized in that, the inner end port of the right end sleeve is provided with a ring portion that is closely fitted with the outer side face of the moving plug, and the outer end port thereof is closely fitted with the moving plug by internally connecting a right end stopper.

* * * * *